(12) United States Patent
Kumar

(10) Patent No.: US 8,588,807 B2
(45) Date of Patent: Nov. 19, 2013

(54) SYSTEM AND METHOD FOR DYNAMICALLY MANAGING CONNECTIONS USING A COVERAGE DATABASE

(75) Inventor: Nitin Kumar, San Ramon, CA (US)

(73) Assignee: Palm, Inc., Sunnyvale, CA (US)

( * ) Notice: Subject to any disclaimer, the term of this patent is extended or adjusted under 35 U.S.C. 154(b) by 361 days.

(21) Appl. No.: 12/769,442

(22) Filed: Apr. 28, 2010

(65) Prior Publication Data
US 2011/0269476 A1      Nov. 3, 2011

(51) Int. Cl.
*H04W 24/00*      (2009.01)
*H04M 1/00*       (2006.01)
*H04W 36/00*      (2009.01)

(52) U.S. Cl.
USPC ............. 455/456.1; 455/550.1; 455/437

(58) Field of Classification Search
USPC ............................. 455/456.1, 550.1
See application file for complete search history.

(56) References Cited

U.S. PATENT DOCUMENTS

| 2004/0192336 A1* | 9/2004 | Walby | 455/456.1 |
| 2007/0099632 A1* | 5/2007 | Choksi | 455/456.1 |
| 2007/0249365 A1* | 10/2007 | Jendbro | 455/456.1 |
| 2010/0184440 A1* | 7/2010 | Mao et al. | 455/437 |

* cited by examiner

*Primary Examiner* — Patrick Edouard
*Assistant Examiner* — Timothy Pham

(57) ABSTRACT

Techniques to dynamically manage wireless connections using a coverage database are described. For example, a mobile computing device may comprise a connection management module operative to dynamically select a wireless connection technology based on a location of the mobile computing device and information from a coverage database, and to initiate a wireless connection using the selected wireless connection technology. Other embodiments are described and claimed.

22 Claims, 4 Drawing Sheets

300

- DYNAMICALLY SELECT A WIRELESS CONNECTION TECHNOLOGY BASED ON A LOCATION OF A MOBILE COMPUTING DEVICE AND INFORMATION FROM A COVERAGE DATABASE
  302

- INITIATE A WIRELESS CONNECTION USING THE SELECTED WIRELESS CONNECTION TECHNOLOGY
  304

*FIG. 3*

SYSTEM AND METHOD FOR DYNAMICALLY MANAGING CONNECTIONS USING A COVERAGE DATABASE

BACKGROUND

Mobile computing devices, such as smart phones, may provide various processing capabilities. For example, mobile devices may provide personal digital assistant (PDA) features, including word processing, spreadsheets, synchronization of information (e.g., e-mail) with a desktop computer, and so forth. In addition, such devices may have wireless communications capabilities. More particularly, mobile devices may employ various communications technologies to provide features, such as mobile telephony, mobile e-mail access, web browsing, and content (e.g., video and radio) reception. Exemplary wireless communications technologies include cellular, satellite, and mobile data networking technologies.

Providing such an array of functionality in a single device provides users with a variety of options in selecting appropriate wireless communications technologies to perform wireless communications tasks. When communicating, it is advantageous to select a wireless communications technology based on device, network or other conditions to improve performance and user experience. As a result, it is desirable to enhance the dynamic selection of wireless communications technologies. For example, it may be advantageous to dynamically select a wireless communication technology using a coverage database and a location of the device. Consequently, there exists a substantial need for techniques to improve the selection and management of wireless connections.

BRIEF DESCRIPTION OF THE DRAWINGS

FIG. 3 illustrates one embodiment of second logic diagram.

DETAILED DESCRIPTION

Figure 1:
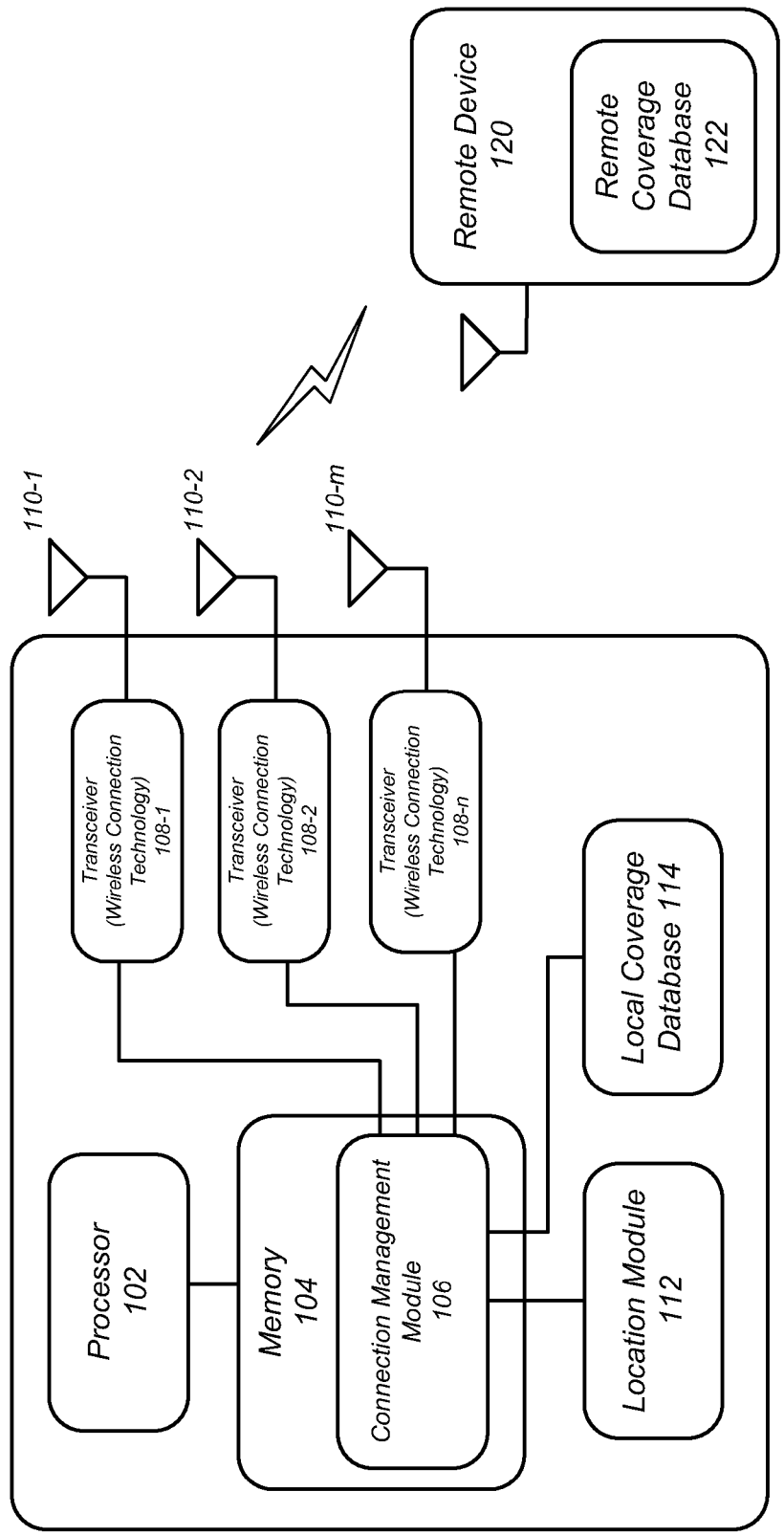
FIG. 1 illustrates one embodiment of a first mobile computing device.

Various embodiments may be generally directed to connection management techniques for a mobile computing device, such as a smart phone. Some embodiments may be particularly directed to dynamic connection management techniques for a mobile computing device based on system, network or other parameters, including information from a coverage database and information regarding one or more locations of a mobile computing device.

In one embodiment, for example, a mobile computing device may include a connection management module. In various embodiments, the connection management module may be operative to dynamically select a wireless transceiver or wireless connection technology based on a location of the mobile computing device and information from a coverage database, and to initiate a wireless connection using the selected wireless connection technology. Examples of information from the coverage database may include one or more system or network parameters including but not limited to network availability, signal quality, system power, system load, system memory, connection speed, type of connection, duration of connection, cost of connection, carrier, roaming or quality of service, each of which may be available for one or more locations, for example. The terms wireless transceiver and wireless connection technology are interchangeable as used hereinafter.

Dynamically selecting one of a plurality of wireless transceivers or connection technologies for initiating a connection may provide several advantages. For example, by enabling dynamic selection, a user may enjoy the benefit of continually establishing connections based on cost, quality, location, time, system resources or any number of other factors at any time without unnecessarily interacting with the mobile computing device or specifically selecting a connection technology each time a connection is desired. If a user wishes to place a telephone call, for example, it may be advantageous for the mobile computing device to automatically and/or dynamically determine which available connection technology would be most efficient and/or cost effective given the current location of the mobile computing device. For example, if the mobile computing device is in a location where a Wireless Fidelity (WiFi) connection is available, it may be advantageous to use the WiFi connection technology to establish the call to conserve the user's wireless minutes associated with their calling plan. If the above-described user were to change locations, for example, it may be advantageous for the mobile computing device to automatically switch to a cellular circuit switching connection if the WiFi connection is no longer available. In some embodiments, it may also be advantageous to select the best of the available connection technologies. For example, if a cellular circuit switching connection is desired and several different cellular circuit switching connections are available (e.g. through different carriers, etc.), the best connection may be selected regardless of roaming or any other factor. Limiting user interaction in the dynamic selection, monitoring and updating of wireless connections may improve user experience and system and network performance. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include other combinations of elements in alternate arrangements as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

FIG. 1 illustrates one embodiment of an apparatus. In particular, FIG. 1 shows a first embodiment of a mobile computing device 100. The mobile computing device 100 may include by way of example and not limitation a processor 102, a memory 104, a connection management module 106, a location module 112, a local coverage database 114, transceivers/wireless connection technologies 108-1-*n* and antennas 110-1-*m*. FIG. 1 also shows a remote device 120 including a remote coverage database 122. These elements or portions of these elements may be implemented in hardware, software, firmware, or in any combination thereof. The embodiments are not limited to these depicted elements.

The mobile computing device 100 may be generally configured to support or provide cellular voice communication, wireless data communication and computing capabilities.

The mobile computing device 100 may be implemented as a combination handheld computer and mobile telephone, sometimes referred to as a smart phone. Examples of smart phones include, for example, Palm® products such as Palm® Pre™ smart phones. Although some embodiments may be described with the mobile computing device 100 implemented as a smart phone by way of example, it may be appreciated that the embodiments are not limited in this context. For example, the mobile computing device 100 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, pager, messaging device, data communication device, and so forth. Additional details for a mobile computing device may be described in more detail with reference to FIG. 4.

The mobile computing device may include a processor 102 coupled to the connection management module 106 in some embodiments. The processor 102 may be operative to execute the connection management module 106. The mobile computing device 100 may further include a memory 104 coupled to the processor 102. The memory 104 may be operative to store the connection management module 106. Other embodiments are described and claimed.

The processor 102 may comprise a general purpose processor or an application specific processor arranged to provide general or specific computing capabilities for the communications system 100. For example, the processor 102 may perform operations associated with higher layer protocols and applications. For instance, the processor 102 may be implemented as a host processor to provide various user applications, such as telephony, text messaging, e-mail, web browsing, word processing, video signal display, and so forth. In addition, the processor 102 may provide one or more functional utilities that are available to various protocols, operations, and/or applications. Examples of such utilities include operating systems, device drivers, user interface functionality, and so forth.

The memory 104 may comprise computer-readable media such as volatile or non-volatile memory units arranged to store programs and data for execution by the processor 102. As depicted in FIG. 1, the memory 104 may store a connection management module 106 in the form of executable program instructions, code or data. The processor 102 may retrieve and execute the program instructions, code or data from the memory 104 to control or provide dynamic connection management operations for the mobile computing device 100. Although the connection management module 106 is shown as part of the memory 104 for execution by the processor 102, it may be appreciated that connection management module 106 may be stored and executed by other memory and processing resources available to the mobile computing device 100. Further, although connection management module 106 is depicted as software executed by a processor, it may be appreciated that the operations for connection management module 106 may be implemented in hardware as well using one or more integrated circuits, for example. The embodiments are not limited in this context.

The mobile computing device 100 may include one or more modules, such as transceiver (connection technology) modules 108-1-$n$ and/or antennas 110-1-$m$, arranged to communicate information over one or more types of wireless communication links. Examples of a wireless communication links may include, without limitation, a radio channel, infrared channel, radio-frequency (RF) channel, WiFi channel, a portion of the RF spectrum, and/or one or more licensed or license-free frequency bands. In the latter case, the wireless nodes may include one more wireless interfaces and/or components for wireless communication, such as one or more transmitters, receivers, transmitter/receivers ("transceivers") 108-1-$n$, radios, chipsets, amplifiers, filters, control logic, network interface cards (NICs), antennas 110-1-$m$, antenna arrays, and so forth. Examples of an antenna may include, without limitation, an internal antenna, an omni-directional antenna, a monopole antenna, a dipole antenna, an end fed antenna, a circularly polarized antenna, a micro-strip antenna, a diversity antenna, a dual antenna, an antenna array, and so forth. In one embodiment, certain devices may include antenna arrays of multiple antennas to implement various adaptive antenna techniques and spatial diversity techniques. Other embodiments are described and claimed.

In various embodiments, connection management module 106 may be configured to and/or operative to dynamically select a wireless connection technology 108-1-$n$ based on a location of the mobile computing device 100 and information from a coverage database, and to initiate a wireless connection using the selected wireless connection technology. For example, mobile computing device 100 may have the capability of establishing different types of wireless connections for different purposes. In some embodiments, a connection for establishing a telephone call or voice connection with a target device using one or more of cellular circuit switching, Voice over Internet Protocol (VoIP) switching over a wireless local area network, a wireless metropolitan area network or any other suitable connection technology may be possible. In some embodiments, mobile computing device 100 may also have the capability of establishing a data connection using cellular circuit switching, or switching over a wireless local area network, a wireless metropolitan area network or any other suitable connection technology. While a limited number of connection technologies for a limited number of uses are described herein for purposes of illustration, it should be understood that any suitable connection technology, wireless communication technology or standard could be used to establish and type of wireless connection and still fall within the described embodiments.

In some embodiments, the dynamic selection of a connection technology by the connection management module 106 may be based on a location of the mobile computing device 100 and information from a coverage database. For example, connection management module 106 may be configured to determine the location of the mobile computing device or receive the location from location module 112, determine a desired type of wireless connection, compare one or more wireless connection technologies that provide the desired type of wireless connection using information from the coverage database and the location of the mobile computing device, and select a wireless connection technology based on the comparison. In various embodiments, the location module 112 may comprise a Global Positioning System (GPS), compass, cellular triangulation logic or any other suitable device or logic operative to determine a location of the mobile computing device 100.

In various embodiments, the coverage database may comprise or include information for one or more wireless connection technologies, the information comprising one or more of network parameters, system parameters, network availability, signal quality, signal strength, connection speed, type of connection, duration of connection, cost of connection or roaming associated with the connection. In some embodiments, the coverage database may comprise a list, database, program archive or other data store containing information about wireless connection technologies in one or more locations. For example, a coverage database may include information regarding types of connections available, carriers for each connection and signal strength of each connection for any number of wireless connection technologies at a particular location.

The coverage database may comprise a local coverage database 114 that is part of mobile computing device 100 and/or a remote coverage database 122 that is part of a remote device 120 that is in or is capable of being in wireless communication with mobile computing device 100 in some embodiments. In various embodiments, local coverage database 114 may be part of or separate from memory 104, and may contain coverage information that is received from remote coverage database 122, synchronized with remote coverage database 122 or is preloaded on mobile computing device 100.

In various embodiments, remote device 120 may comprise a wireless communication device similar to mobile computing device 100. For example, remote device 120 may comprise a second mobile computing device, a router, a node B, cellular interface, gateway, switch or other network device capable of wirelessly communicating with mobile computing device 100. In some embodiments, remote coverage database 122 may comprise or contain coverage information that is controlled, loaded and/or managed by a carrier or service provider, for example. The coverage database referred to throughout may comprise the local coverage database 114, the remote coverage database 122 or a combination and/or synchronization of both the local coverage database 114 and the remote coverage database 122. Other embodiments are described and claimed.

In various embodiments, the coverage database may be populated with information provided by a network service provider, information from a community of users, or the information that is learned by each device over time through use in a variety of locations. The information in the coverage database may map a given location to coverage information for different services, carriers or wireless connection technologies at that location. Other embodiments are described and claimed.

In some embodiments, the location of the mobile computing device 100 may comprise a current location. For example, connection management module 106, or any other suitable module such as a location module, may determine the current location of the mobile computing device and may select a wireless connection technology to meet current wireless connection requirements for an application of the mobile computing device. In some embodiments, the current wireless connection requirements may be based on the requirements of one or more active applications or based on user requests. For example, in one embodiment a telephone application may receive information indicating that the users wishes to initiate a wireless telephone call. In this example, connection management module 106 may evaluate information from the coverage database to determine which of any available wireless connection technologies will best serve the needs of establishing the requested telephone call.

In various embodiments, the location may comprise one or more anticipated locations of the mobile computing device. In some embodiments the connection management module or any other suitable module may be operative to estimate the one or more anticipated locations of the mobile computing device 100 using one or more of a global positioning system (GPS), a compass, a GPS history, a known destination location or address or a direction of movement of the mobile computing device 100. For example, mobile computing device 100 may include a GPS module operative to report a current location of the mobile computing device 100 to the connection management module 106, and to also report one or more anticipated future locations of the mobile computing device 100 based on an address entered by the user for use in determining directions to a known location.

In some embodiments, the connection management module 106 may be operative to select a wireless connection technology to meet the current wireless connection requirements and, prior to arrival at the one or more anticipated locations, to send or receive data for an application that would require a wireless data connection at the one or more anticipated locations if a limited or no wireless data connection is or will be available at the one or more anticipated locations. For example, the connection management module 106 may use information from a coverage database that includes information for each anticipated location or multiple coverage databases to determine what type and quality of connections will be available at each location. If, for example, the coverage database indicates that one or more anticipated locations do not include an appropriate wireless connection technology, signal strength, or other parameter to meet the needs of an active application, connection management module may send and/or receive information that the application will use when the mobile computing device 100 arrives at the deficient anticipated location prior to the arrival at the location.

In various embodiments, the application may comprise a global position system (GPS) application and the connection management module may be operative to download, prior to arrival at the one or more anticipated locations, map information to be used by the GPS application at the one or more anticipated locations. In some embodiments, the application may comprise a multimedia application and the connection management module may be operative to download, prior to arrival at the one or more anticipated locations, multimedia information to be used by the multimedia application at the one or more anticipated locations. While a limited number of applications, wireless connections technologies, network parameters and other factors are described herein for purposes of illustration, it should be understood that any factor, information, application, connections technology or other parameter could be used to assist in the dynamic selection of a connection technology and still fall within the described embodiments.

In various embodiments, the connection management module 106 may be configured to execute an algorithm to generate an expected quality of service (QoS) or service matrix for each connection technology at one or more locations and select a connection technology based on the expected QoS or switching matrix. For example, the algorithm may include any of the above or any other factors relevant to establishing a wireless connection using one of a plurality of available connection technologies 108-1-n. In some embodiments, the expected QoS and/or service matrix may be based on one or more cost metrics or performance metrics for each available connection technology 108-1-n. Other embodiments are described and claimed.

In various embodiments, the connection management module 106 may be configured to automatically initiate the connection with the one or more target devices using the dynamically selected connection technology. For example, a user may enable the dynamic selection using the connection management module 106 as a system preference or application, and may optionally enter preferences regarding connection technologies and connections during a setup process.

After being enabled, the dynamic selection and automatic connection process may continue with limited or no user interaction until the feature is disabled or otherwise disconnected.

In some embodiments, dynamic selection and automatic connection initiation by the connection management module 106 may be a default feature that is implemented when a device is activated and may optionally be deactivated by a user. Making the dynamic selection and automatic connection a default operation may result in a user never needing to change any preferences regarding wireless connections in some embodiments.

The connection management preference/application may comprise one or more visible user interfaces for ease of use in some embodiments. For example, the application may comprise a simple interface allowing a user to enable or disable the dynamic connection selection feature, and to select preferences for establishing connections. Preferences may include, for example, ranking of items by importance to the user, such as cost, quality, processing impact or any other factor. In some embodiments, an underlying or hidden layer may be configured for decision making. For example, the algorithm described above may comprise the underlying layer.

In various embodiments, the connection management module 106 may be configured to monitor the selected connection technology and one or more non-selected connection technologies after a connection has been established. For example, mobile computing device 100 may establish a connection with a target device using a dynamically selected connection technology and the connection management module 106 may, thereafter, continue to monitor to the established connection as well as other available connections. In some embodiments, the connection management module 106 may be configured to automatically perform a handoff to one of the one or more non-selected connection technologies based on changes in system, network, or other parameters. For example, if the connection management module 106 determines that a non-selected connection technology is now more advantageous than the currently implemented connection technology, a handoff may occur. The handoff may be transparent to the user in some embodiments in that the handoff occurs in the background without dropping an existing call or data connection, for example.

Operations for the above embodiments may be further described with reference to the following figures and accompanying examples. Some of the figures may include a logic diagram. Although such figures presented herein may include a particular logic diagram, it can be appreciated that the logic diagram merely provides an example of how the general functionality as described herein can be implemented. Further, the given logic diagram does not necessarily have to be executed in the order presented, unless otherwise indicated. In addition, the given logic diagram may be implemented by a hardware element, a software element executed by a processor, or any combination thereof. The embodiments are not limited in this context.

Figure 2:
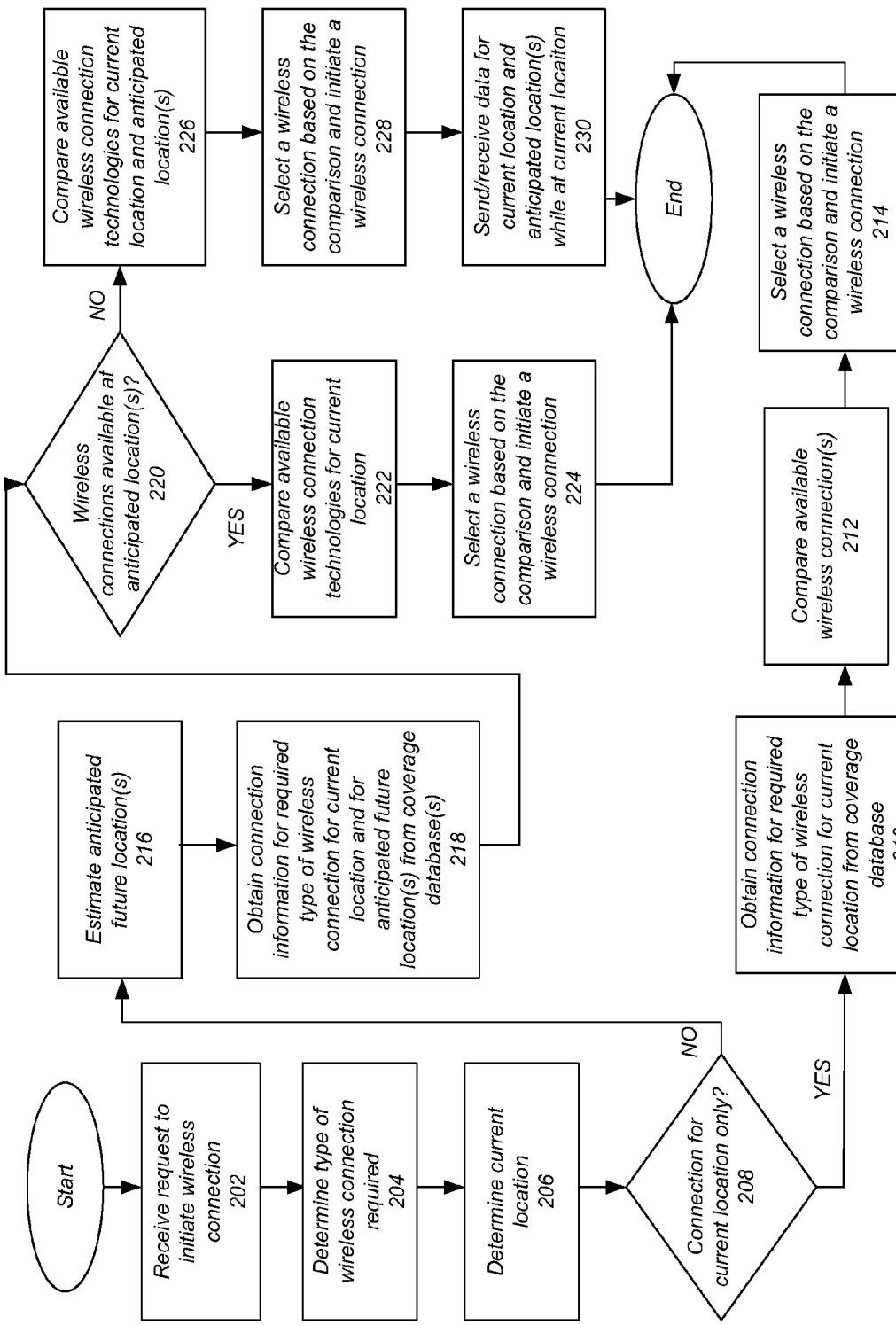
FIG. 2 illustrates one embodiment of a first logic diagram.

FIG. 2 illustrates a first embodiment of a logic diagram. In particular, FIG. 2 illustrates a logic diagram 200, which may be representative of the operations executed by one or more embodiments described herein. FIG. 2 illustrates an embodiment of a connection process for mobile computing device 100 including a connection management module 106, for example.

In various embodiments, a request to initiate a wireless connection may be received at 202. For example, a user may initiate a wireless telephone call using mobile computing device 100 in an effort to establish a wireless telephone connection with a user of a target device or a user may request an email application to check for current email using a data connection. At 204, a required type of wireless connection may be determined in some embodiments. For example, connection management module 106 may execute an algorithm or otherwise determine what type of wireless connection is required or acceptable to perform the task(s) associated with the requested wireless connection. In some embodiments, a current location may be determined at 206. For example, mobile computing device 100 may include a GPS or other location capable device that reports the current location of the mobile computing device 100 to the connection management module 106.

At 208, a determination may be made as to whether the connection is needed for only the current location in some embodiments. For example, connection management module 106 may determine, based on the type of connection requested, the type of active application requiring a connection, the type of data transfer, or information about movement or potential movement of mobile computing device 100 whether or not the requested wireless connection will be required only at the current location of the mobile computing device.

In some embodiments, if the connection is only needed for the current location, connection information for the required type of wireless connection at the current location may be obtained from a coverage database at 210. For example, connection management module 106 may determine that the current type of required wireless connection is a cellular connection, and may obtain information for any available cellular services in the area of the current location. At 212, the available wireless connections may be compared in some embodiments. For example, connection management module 106 may compare the available cellular connections based on information regarding quality of service, signal strength, etc. from the coverage database. In various embodiments, at 214, a wireless connection may be selected and initiated based on the comparison.

In various embodiments, if the determination at 208 indicates that the connection will not be limited to only the current location, anticipated future locations may be estimated at 216. For example, connection management module 106 may factor in the current location of the mobile computing device 100, movement of the device, direction of the movement, an intended destination or address or any other relevant factor to determine possible anticipated future locations of the mobile computing device 100.

At 218, in some embodiments, information for the required type of wireless connection for the current location and for any anticipated future locations may be obtained from one or more coverage databases. For example, connection management module 106 may obtain information from a different coverage database for each of the current and future anticipated locations to obtain information regarding the types and quality of wireless connections available at each location.

In some embodiments, a determination is made at 220 as to whether the required type of connection having sufficient quality is available at the anticipated locations. If so, the available wireless connection technologies for the current location may be compared at 222 and a wireless connection may be selected and initiated at 224 based on the comparison. For example, connection management module 106 may determine that sufficient wireless connections to meet current and any anticipated future wireless needs will be met along the route of the mobile computing device, including the anticipated locations. In this example, connection management module 106 may focus on the wireless needs of mobile computing device 100 at the current location and any handoff or additional/alternative wireless connections may be handled appropriately upon arrival at the anticipated locations.

If it is determined at 220 that one or more anticipated locations will not provide adequate wireless services, a comparison of wireless connection technologies may be performed at 226 and a selection and initiation of a wireless connection may be made at 228. At 230, in some embodiments, data for the current location and for the one or more anticipated future locations that will not provide sufficient wireless services may be sent/received while at the current location. For example, connection management module 106 may determine that an application may require wireless networking capabilities at one or more anticipated locations that will not provide sufficient wireless services. In this example, connection management module 106 may send or receive data for the application at the current location that will be used by the application upon arrival at the anticipated location such that no drop in service is apparent to the user. Other embodiments are described and claimed.

FIG. 3 illustrates a second embodiment of a logic diagram. In particular, FIG. 3 illustrates a logic diagram 300, which may be representative of the operations executed by one or more embodiments described herein. As shown in the FIG. 3, one of a plurality of wireless connection technologies may be dynamically selected based on a location of a mobile computing device and information from a coverage database at 302. For example, connection management module 106 may be configured to dynamically select one of a plurality of connection technologies based on a location of mobile computing device 100 and information from a coverage database. At 304, in some embodiments, a wireless connection may be initiated using the selected wireless connection technology. For example, connection management module 106 may initiate a wireless connection using the selected wireless technology.

In various embodiments, a location of the mobile computing device may be determined. For example, the location may comprise a current location of the mobile computing device 100 or one or more anticipated future locations of the mobile computing device 100. In some embodiments, the one or more anticipated locations may be estimated using one or more of a global positions system (GPS), a compass, a GPS history, a known destination location or address or a direction of movement of a mobile computing device.

A desired type of wireless connection may be determined in some embodiments. For example, connections management module 106 may determine what type and/or quality of connection is required by mobile computing device 100. In various embodiments, one or more wireless connection technologies that provide the desired type of wireless connection may be compared using information from the coverage database and the location of the mobile computing device, and a wireless connection technology may be selected based on the comparison. For example, a wireless connection technology may be selected to meet wireless connection requirements for an application executed at a current location.

In some embodiments, prior to arriving at one or more anticipated locations, data for an application that would require a wireless data connection at one or more anticipated locations may be sent and/or received at the current location if a limited or no wireless data connection is available at the one or more anticipated locations. For example, prior to arrival at the one or more anticipated locations, map information to be used by a global positioning system (GPS) application at the one or more anticipated locations may be downloaded at the current location while a sufficient wireless connection is available. In another example, prior to arrival at the one or more anticipated locations, multimedia information to be used by a multimedia application at the one or more anticipated locations may be downloaded at the current location. Other embodiments are described and claimed.

Figure 4:
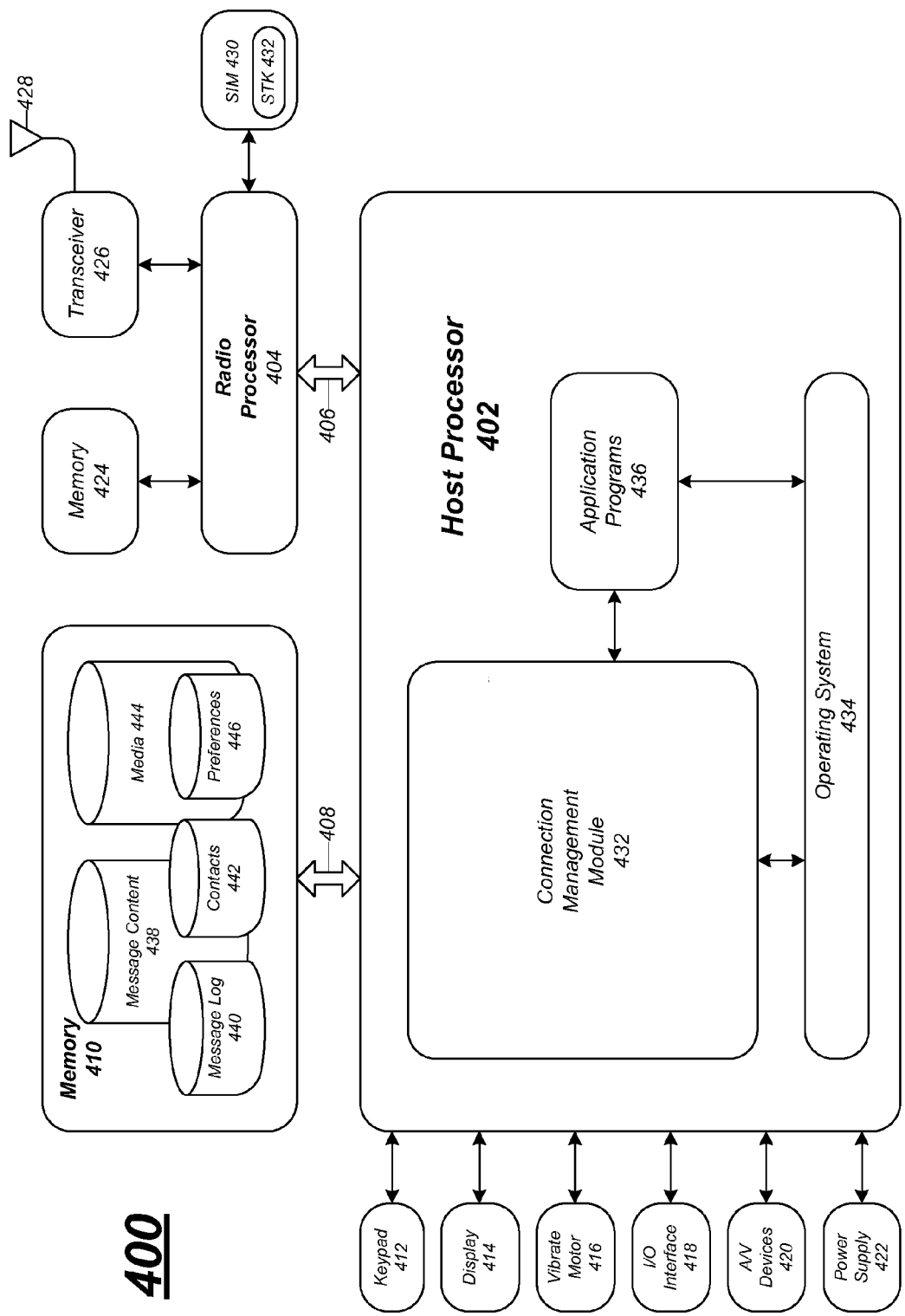
FIG. 4 illustrates one embodiment of a second mobile computing device.

FIG. 4 illustrates a block diagram of a mobile computing device 400 suitable for implementing various embodiments, including the mobile computing device 100. It may be appreciated that the mobile computing device 400 is only one example of a suitable mobile computing environment and is not intended to suggest any limitation as to the scope of use or functionality of the embodiments. Neither should the mobile computing device 400 be interpreted as having any dependency or requirement relating to any one or combination of components illustrated in the exemplary mobile computing device 400.

The host processor 402 (e.g., similar to the processor 102) may be responsible for executing various software programs such as system programs and applications programs to provide computing and processing operations for the mobile computing device 400. The radio processor 404 may be responsible for performing various voice and data communications operations for the mobile computing device 400 such as transmitting and receiving voice and data information over one or more wireless communications channels. Although the mobile computing device 400 is shown with a dual-processor architecture, it may be appreciated that the mobile computing device 400 may use any suitable processor architecture and/or any suitable number of processors in accordance with the described embodiments. In one embodiment, for example, the processors 402, 404 may be implemented using a single integrated processor.

The host processor 402 may be implemented as a host central processing unit (CPU) using any suitable processor or logic device, such as a as a general purpose processor. The host processor 402 may also be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the host processor 402 may be coupled through a memory bus 408 to a memory 410. The memory bus 408 may comprise any suitable interface and/or bus architecture for allowing the host processor 402 to access the memory 410. Although the memory 410 may be shown as being separate from the host processor 402 for purposes of illustration, it is worthy to note that in various embodiments some portion or the entire memory 410 may be included on the same integrated circuit as the host processor 402. Alternatively, some portion or the entire memory 410 may be disposed on an integrated circuit or other medium (e.g., hard disk drive) external to the integrated circuit of the host processor 402. In various embodiments, the mobile computing device 400 may comprise an expansion slot to support a multimedia and/or memory card, for example.

The memory 410 may be implemented using any computer-readable media capable of storing data such as volatile or non-volatile memory, removable or non-removable memory, erasable or non-erasable memory, writeable or re-writeable memory, and so forth. Examples of computer-readable storage media may include, without limitation, random-access memory (RAM), dynamic RAM (DRAM), Double- Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The mobile computing device 400 may comprise an alphanumeric keypad 412 coupled to the host processor 402. The keypad 412 may comprise, for example, a QWERTY key layout and an integrated number dial pad. The mobile computing device 400 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth. The keypad 412 may comprise a physical keypad using hard buttons, or a virtual keypad using soft buttons displayed on a display 414.

The mobile computing device 400 may comprise a display 414 coupled to the host processor 402. The display 414 may comprise any suitable visual interface for displaying content to a user of the mobile computing device 400. In one embodiment, for example, the display 414 may be implemented by a liquid crystal display (LCD) such as a touch-sensitive color (e.g., 46-bit color) thin-film transistor (TFT) LCD screen. The touch-sensitive LCD may be used with a stylus and/or a handwriting recognizer program.

The mobile computing device 400 may comprise a vibrate motor 416 coupled to the host processor 402. The vibrate motor 416 may be enable or disabled according to the preferences of the user of the mobile computing device 400. When enabled, the vibrate motor 416 may cause the mobile computing device 400 to move or shake in a generic and/or patterned fashion in response to a triggering event such as the receipt of a telephone call, text message, an alarm condition, a game condition, and so forth. Vibration may occur for a fixed duration and/or periodically according to a pulse.

The mobile computing device 400 may comprise an input/output (I/O) interface 418 coupled to the host processor 402. The I/O interface 418 may comprise one or more I/O devices such as a serial connection port, an infrared port, integrated Bluetooth wireless capability, and/or integrated 802.11x (WiFi) wireless capability, to enable wired (e.g., USB cable) and/or wireless connection to a local computer system, such as a local personal computer (PC). In various implementations, mobile computing device 400 may be arranged to synchronize information with a local computer system.

The host processor 402 may be coupled to various audio/video (A/V) devices 420 that support A/V capability of the mobile computing device 400. Examples of A/V devices 420 may include, for example, a microphone, one or more speakers (such as speaker system 108), an audio port to connect an audio headset, an audio coder/decoder (codec), an audio player, a Musical Instrument Digital Interface (MIDI) device, a digital camera, a video camera, a video codec, a video player, and so forth.

The host processor 402 may be coupled to a power supply 422 arranged to supply and manage power to the elements of the mobile computing device 400. In various embodiments, the power supply 422 may be implemented by a rechargeable battery, such as a removable and rechargeable lithium ion battery to provide direct current (DC) power, and/or an alternating current (AC) adapter to draw power from a standard AC main power supply.

The radio processor 404 may be arranged to communicate voice information and/or data information over one or more assigned frequency bands of a wireless communication channel. The radio processor 404 may be implemented as a communications processor using any suitable processor or logic device, such as a modem processor or baseband processor. The radio processor 404 may also be implemented as a digital signal processor (DSP), media access control (MAC) processor, or any other type of communications processor in accordance with the described embodiments. The radio processor 404 may perform analog and/or digital baseband operations for the mobile computing device 400. For example, the radio processor 404 may perform digital-to-analog conversion (DAC), analog-to-digital conversion (ADC), modulation, demodulation, encoding, decoding, encryption, decryption, and so forth.

The mobile computing device 400 may comprise a memory 424 coupled to the radio processor 404. The memory 424 may be implemented using any of the computer-readable media described with reference to the memory 410. The memory 424 may be typically implemented as flash memory and secure digital (SD) RAM. Although the memory 424 may be shown as being separate from the radio processor 404, some or all of the memory 424 may be included on the same IC as the radio processor 404.

The mobile computing device 400 may comprise a transceiver module 426 coupled to the radio processor 404. The transceiver module 426 may comprise one or more transceivers arranged to communicate using different types of protocols, communication ranges, operating power requirements, RF sub-bands, information types (e.g., voice or data), use scenarios, applications, and so forth, similar to transceivers/connection technologies 108-1-$n$ of FIG. 1. In various embodiments, the transceiver module 426 may comprise one or more transceivers arranged to support voice communications and/or data communications for the wireless network systems or protocols as previously described. In some embodiments, the transceiver module 426 may further comprise a Global Positioning System (GPS) transceiver to support position determination and/or location-based services.

The transceiver module 426 generally may be implemented using one or more chips as desired for a given implementation. Although the transceiver module 426 may be shown as being separate from and external to the radio processor 404 for purposes of illustration, it is worthy to note that in various embodiments some portion or the entire transceiver module 426 may be included on the same integrated circuit as the radio processor 404. The embodiments are not limited in this context.

The mobile computing device 400 may comprise an antenna system 428 for transmitting and/or receiving electrical signals, similar to antennas 110-1-$m$ of FIG. 1. As shown, the antenna system 428 may be coupled to the radio processor 404 through the transceiver module 426. The antenna system 428 may comprise or be implemented as one or more internal antennas and/or external antennas.

The mobile computing device 400 may comprise a subscriber identity module (SIM) 430 coupled to the radio processor 404. The SIM 430 may comprise, for example, a removable or non-removable smart card arranged to encrypt voice and data transmissions and to store user-specific data for allowing a voice or data communications network to identify and authenticate the user. The SIM 430 also may store data such as personal settings specific to the user. In some embodiments, the SIM 430 may be implemented as an UMTS universal SIM (USIM) card or a CDMA removable user identity module (RUIM) card. The SIM 430 may comprise a SIM application toolkit (STK) 432 comprising a set of programmed commands for enabling the SIM 430 to perform various functions. In some cases, the STK 432 may be arranged to enable the SIM 430 to independently control various aspects of the mobile computing device 400.

As mentioned above, the host processor 402 may be arranged to provide processing or computing resources to the mobile computing device 400. For example, the host processor 402 may be responsible for executing various software programs including system programs such as operating system (OS) 434 and application programs 436. System programs generally may assist in the running of the mobile computing device 400 and may be directly responsible for controlling, integrating, and managing the individual hardware components of the computer system. The OS 434 may be implemented, for example, as a Palm OS®, Palm OS® Cobalt, Microsoft® Windows OS, Microsoft Windows® CE OS, Microsoft Pocket PC OS, Microsoft Mobile OS, Symbian OS™, Embedix OS, Linux OS, Binary Run-time Environment for Wireless (BREW) OS, JavaOS, a Wireless Application Protocol (WAP) OS, or other suitable OS in accordance with the described embodiments. The mobile computing device 400 may comprise other system programs such as device drivers, programming tools, utility programs, software libraries, application programming interfaces (APIs), and so forth.

Application programs 436 generally may allow a user to accomplish one or more specific tasks. In various implementations, the application programs 436 may provide one or more graphical user interfaces (GUIs) to communicate information between the mobile computing device 400 and a user. In some embodiments, application programs 436 may comprise upper layer programs running on top of the OS 434 of the host processor 402 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication.

Examples of application programs 436 may include, without limitation, messaging applications, web browsing applications, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. Messaging applications may be arranged to communicate various types of messages in a variety of formats. Examples of messaging applications may include without limitation a cellular telephone application, a Voice over Internet Protocol (VoIP) application, a Push-to-Talk (PTT) application, a voicemail application, a facsimile application, a video teleconferencing application, an IM application, an e-mail application, an SMS application, an MMS application, and so forth. It is also to be appreciated that the mobile computing device 400 may implement other types of applications in accordance with the described embodiments.

The host processor 402 may include a connection management module 432. The connection management module 432 may be the same or similar to the connection management module 106 described with reference to FIG. 1.

The mobile computing device 400 may include various databases implemented in the memory 410. For example, the mobile computing device 400 may include a message content database 438, a message log database 440, a contacts database 442, a media database 444, a preferences database 446, and so forth. The message content database 438 may be arranged to store content and attachments (e.g., media objects) for various types of messages sent and received by one or more messaging applications. The message log 440 may be arranged to track various types of messages which are sent and received by one or more messaging applications. The contacts database 442 may be arranged to store contact records for individuals or entities specified by the user of the mobile computing device 400. The media database 444 may be arranged to store various types of media content such as image information, audio information, video information, and/or other data. The preferences database 446 may be arranged to store various settings such as rules and parameters for controlling the operation of the mobile computing device 400.

In some cases, various embodiments may be implemented as an article of manufacture. The article of manufacture may include a storage medium arranged to store logic and/or data for performing various operations of one or more embodiments. Examples of storage media may include, without limitation, those examples as previously described. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A mobile computing device, comprising:
   a coverage database to store coverage information for a plurality of wireless connection technologies used by the mobile computing device at one or more locations; and
   a connection management module to:
      determine a type of wireless connection to be used by the mobile computing device;
      determine a current location and an anticipated location of the mobile computing device;
      determine that the type of wireless connection to be used having sufficient quality is unavailable at the anticipated location;
      perform, for the current location of the device, a comparison of the coverage information associated with each of two or more wireless connection technologies capable of providing the type of wireless connection;
      select a current wireless connection technology by selecting a corresponding wireless transceiver based on the comparison;
      initiate a wireless connection using the selected wireless transceiver; and
      prior to arrival at the anticipated location, communicate data for an application, which otherwise would have been communicated using an anticipated wireless connection technology when the mobile computing device arrives at the anticipated location of the mobile computing device, using the current wireless connection technology at the current location of the mobile computing device.

2. The mobile computing device of claim 1, wherein the type of wireless connection comprises a wireless voice connection using cellular circuit switching, a wireless local area network or a wireless metropolitan area network, or a wireless data connection using cellular circuit switching, a wireless local area network or a wireless metropolitan area network.

3. The mobile computing device of claim 1, wherein the connection management module receives a request to initiate a wireless connection in response to a user initiating the application, and selects the wireless transceiver to meet current wireless connection parameters for the application.

4. The mobile computing device of claim 1, wherein the connection management module determines the anticipation location using at least one of a movement of the mobile computing device, a direction of the movement of the mobile computing device, or an intended destination or address.

5. The mobile computing device of claim 4, wherein the application comprises a global position system (GPS) application, and wherein the connection management module communicates data for the GPS application by downloading map information to be used by the GPS application at the anticipated location.

6. The mobile computing device of claim 4, wherein the application comprises a multimedia application, and wherein the connection management module communicates data for the multimedia application by downloading multimedia information to be used by the multimedia application at the anticipated location.

7. The mobile computing device of claim 1, wherein the connection management module determines the anticipated location using location information generated by at least one of a global positioning system (GPS), triangulation, a compass, or a GPS history.

8. The mobile computing device of claim 1, wherein the coverage information includes one or more of network parameters, system parameters, network availability, signal quality, signal strength, connection speed, type of connection, duration of connection or cost of connection.

9. A computer-implemented method, comprising:
   storing coverage information for a plurality of wireless connection technologies used by a mobile computing device at one or more locations;
   determining a current location of the mobile computing device;
   determining a type of wireless connection to be used by the mobile computing device;
   determining an anticipated location of the mobile computing device;
   determining that the type of wireless connection to be used having sufficient quality is unavailable at the anticipated location;
   performing, for the current location of the device, a comparison of the coverage information associated with each of two or more wireless connection technologies capable of providing the type of wireless connection;
   selecting a current wireless connection technology by selecting a corresponding a wireless transceiver based on the comparison;
   initiating a wireless connection using the selected wireless transceiver; and
   prior to arrival at the anticipated location, communicating data for an application, which otherwise would have been communicated using an anticipated wireless connection technology when the mobile computing device arrives at the anticipated location of the mobile computing device, using the current wireless connection technology at the current location of the mobile computing device.

10. The method of claim 9, wherein selecting a wireless transceiver further comprises:
    selecting a wireless transceiver to meet wireless connection requirements for an application executed at a current location.

11. The method of claim 9, further comprising:
receiving a request to initiate a wireless connection in response to a user initiating the application.

12. The method of claim 9, wherein determining an anticipated location of the mobile computing device includes using one or more of a global positioning system (GPS), a compass, a GPS history, a known destination location or address, or a direction of movement of the mobile computing device.

13. The method of claim 9, wherein the application comprises a global position system (GPS) application, and wherein communicating data includes receiving map information to be used by the GPS application at the anticipated location.

14. The method of claim 9, wherein the application comprises a multimedia application, and wherein communicating data includes receiving multimedia information to be used by the multimedia application at the anticipated location.

15. The method of claim 9, wherein the coverage information includes one or more of network parameters, system parameters, network availability, signal quality, signal strength, connection speed, type of connection, duration of connection or cost of connection.

16. A non-transitory computer-readable storage medium storing instructions that, when executed by a processor, enable a system to:
store coverage information for a plurality of wireless connection technologies used by a mobile computing device at one or more locations;
determine a current location of the mobile computing device;
determine a type of wireless connection to be used by the mobile computing device;
determine an anticipated location of the mobile computing device;
determine that the type of wireless connection to be used having sufficient quality is unavailable at the anticipated location;
perform, for the current location of the device, a comparison of the coverage information associated with each of two or more wireless connection technologies capable of providing the type of wireless connection;
select a current wireless connection technology by selecting a corresponding a wireless transceiver based on the comparison;
initiate a wireless connection using the selected wireless transceiver; and
prior to arrival at the anticipated location, communicate data for an application, which otherwise would have been communicated using an anticipated wireless connection technology when the mobile computing device arrives at the anticipated location of the mobile computing device, using the current wireless connection technology at the current location of the mobile computing device.

17. The computer-readable storage medium of claim 16, further comprising instructions that, when executed, enable the system to:
select a wireless transceiver to meet wireless connection requirements for an application at a current location.

18. The computer-readable storage medium of claim 16, further comprising instructions that, when executed, enable the system to:
receive a request to initiate a wireless connection in response to a user initiating the application.

19. The computer-readable storage medium of claim 18, wherein the coverage information includes one or more of network parameters, system parameters, network availability, signal quality, signal strength, connection speed, type of connection, duration of connection or cost of connection.

20. The computer-readable storage medium of claim 16, wherein the instructions that, when executed, enable the system to:
determine an anticipated location of the mobile computing device by using location information generated by one or more of a global positioning system (GPS), a compass, a GPS history, a known destination location or address, or a direction of movement of the mobile computing device.

21. The computer-readable storage medium of claim 16, wherein the application comprises a global position system (GPS) application, and wherein the instructions that, when executed, enable the system to communicate data by receiving map information to be used by the application at the anticipated location.

22. The computer-readable storage medium of claim 16, wherein the application comprises a multimedia application, and wherein the instructions that, when executed, enable the system to communicate data by receiving multimedia information to be used by the multimedia application at the anticipated location.

* * * * *